United States Patent
Kim et al.

(10) Patent No.: US 11,936,000 B2
(45) Date of Patent: Mar. 19, 2024

(54) SOLID POLYMER ELECTROLYTE COMPOSITION, AND SOLID POLYMER ELECTROLYTE CONTAINING SAME

(71) Applicant: LG CHEM, LTD., Seoul (KR)

(72) Inventors: Lucia Kim, Daejeon (KR); Jehoon Lee, Daejeon (KR); Jonghyun Chae, Daejeon (KR); Dong Hyeop Han, Daejeon (KR); Wansoo Chang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 795 days.

(21) Appl. No.: 17/040,274

(22) PCT Filed: Sep. 20, 2019

(86) PCT No.: PCT/KR2019/012242
§ 371 (c)(1),
(2) Date: Sep. 22, 2020

(87) PCT Pub. No.: WO2020/060292
PCT Pub. Date: Mar. 26, 2020

(65) Prior Publication Data
US 2021/0005930 A1    Jan. 7, 2021

(30) Foreign Application Priority Data
Sep. 20, 2018    (KR) .................. 10-2018-0113256

(51) Int. Cl.
*H01M 10/0565*    (2010.01)
*H01M 10/0525*    (2010.01)

(52) U.S. Cl.
CPC ... *H01M 10/0565* (2013.01); *H01M 10/0525* (2013.01); *H01M 2300/0082* (2013.01)

(58) Field of Classification Search
CPC ......... H01M 10/0525; H01M 10/0565; H01M 2300/0082
See application file for complete search history.

(56) References Cited

U.S. PATENT DOCUMENTS 6,395,429 B1    5/2002  Kang et al.
6,469,107 B1   10/2002  Sato
(Continued)

FOREIGN PATENT DOCUMENTS

CN    1848848 A    7/2005
CN  106663835 A    5/2017
(Continued)

OTHER PUBLICATIONS

Extended European Search Report, dated May 25, 2021, for European Application No. 19862682.2.
(Continued)

*Primary Examiner* — Brittany L Raymond
(74) *Attorney, Agent, or Firm* — Birch, Stewart, Kolasch & Birch, LLP

(57) ABSTRACT

A solid polymer electrolyte composition and a solid polymer electrolyte are disclosed. More particularly, a solid polymer electrolyte composition and a solid polymer electrolyte formed by photocuring the same are disclosed, including a polymer (A) containing alkylene oxide and having one reactive double bond, a multifunctional cross-linkable polymer (B), and an ionic liquid, wherein the ionic liquid includes an amide-based solvent and a lithium salt.

12 Claims, 1 Drawing Sheet

(56) References Cited

U.S. PATENT DOCUMENTS

| | | | |
|---|---|---|---|
| 2003/0044688 A1 | 3/2003 | Kang et al. | |
| 2003/0232240 A1 | 12/2003 | Lee et al. | |
| 2005/0042515 A1* | 2/2005 | Hwang | H01M 10/0565 |
| | | | 429/231.95 |
| 2010/0021815 A1 | 1/2010 | Oh et al. | |
| 2013/0337337 A1 | 12/2013 | Lee et al. | |
| 2015/0263385 A1 | 9/2015 | Yoon et al. | |
| 2017/0288255 A1* | 10/2017 | Kim | H01M 10/058 |
| 2018/0254520 A1 | 9/2018 | Maeda | |

FOREIGN PATENT DOCUMENTS

| | | | |
|---|---|---|---|
| CN | 107425197 A | 12/2017 | |
| CN | 110117417 A | 8/2019 | |
| JP | 2002-280075 A | 9/2002 | |
| JP | 2003-51428 A | 2/2003 | |
| JP | 2003-229019 A | 8/2003 | |
| JP | 2004-296335 A | 10/2004 | |
| JP | 2017-529663 A | 10/2017 | |
| KR | 10-2003-0097009 A | 12/2003 | |
| KR | 10-0884479 B1 | 2/2009 | |
| KR | 10-1179356 B1 | 9/2012 | |
| KR | 10-2013-0142224 A | 12/2013 | |
| KR | 10-1422726 B1 | 7/2014 | |
| KR | 10-2014-0145450 A | 12/2014 | |
| KR | 10-1634107 B1 | 6/2016 | |
| KR | 10-1666714 B1 | 10/2016 | |
| WO | WO 00/36017 A1 | 6/2000 | |
| WO | WO 2017/047379 A1 | 3/2017 | |

OTHER PUBLICATIONS

Fu et al., "Effect of side chain branching on enhancement of ionic conductivity and capacity retention of copolymer electrolyte membrane", Langmuir, 33, 49, 2017, pp. 13973-13981 (Total No. Pgs. 33).

International Search Report issued in PCT/KR2019/012242 (PCT/ISA/210), dated Dec. 30, 2019.

* cited by examiner

【Figure 1】
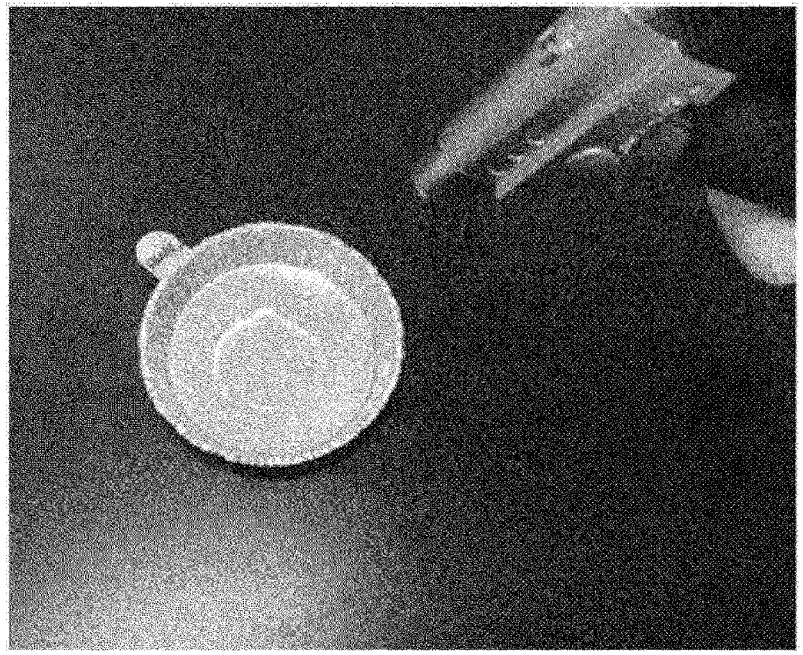
【Figure 2】
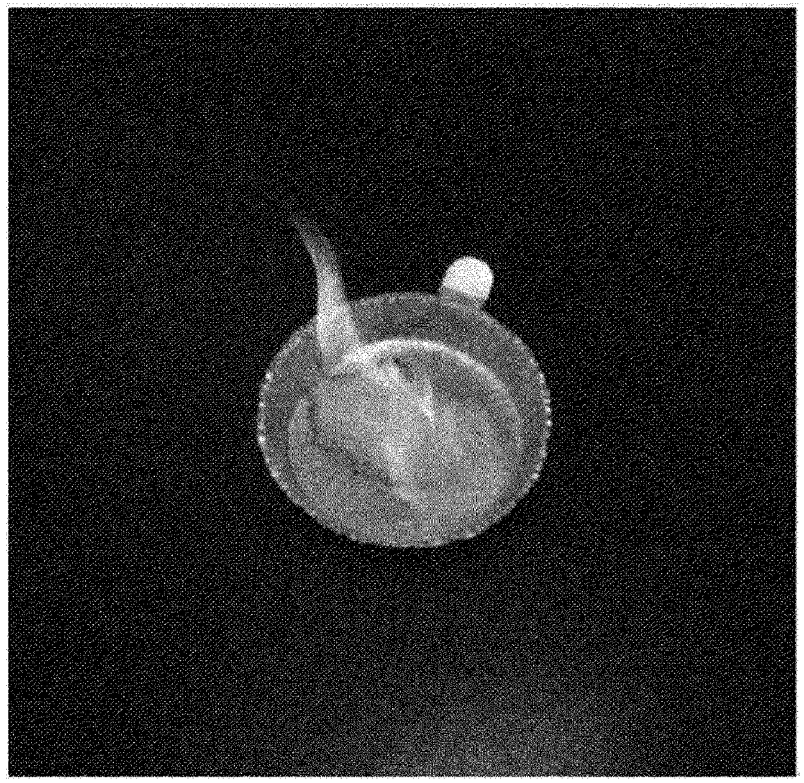

SOLID POLYMER ELECTROLYTE COMPOSITION, AND SOLID POLYMER ELECTROLYTE CONTAINING SAME

TECHNICAL FIELD

The present application claims the benefit of priority based on Korean Patent Application No. 10-2018-0113256 filed on Sep. 20, 2018, all the contents of which are incorporated herein by reference.

The present invention relates to a solid polymer electrolyte composition and a solid polymer electrolyte comprising the same.

BACKGROUND ART

Currently, the lithium ion secondary battery having a high energy density mainly used in notebooks and smartphones is composed of a positive electrode made of lithium oxide, a carbon-based negative electrode, a separator, and an electrolyte. Conventionally, a liquid-state electrolyte, particularly an ion conductive organic liquid electrolyte in which salts are dissolved in a non-aqueous organic solvent, has been mainly used as the electrolyte. However, if a liquid-state electrolyte as described above is used, not only is there a high possibility that the electrode material is degraded and the organic solvent is volatilized, but there is also a problem in safety due to combustion caused by an increase in the ambient temperature and the temperature of the battery itself. In particular, the lithium secondary battery has a problem that during charging and discharging, gas is generated inside the battery due to decomposition of the organic solvent and/or side reaction between the organic solvent and the electrode, thereby expanding the thickness of the battery, and during the storage at high temperature, this reaction is accelerated and the amount of gas generated is further increased.

The gas thus generated continuously causes an increase in the internal pressure of the battery, which causes the rectangular battery to swell in a specific direction and to explode, or which deforms the center of a specific surface of the battery, thereby leading to a decrease in safety, and also which causes a local difference in adhesion at the electrode surface in the battery, thereby leading to a disadvantage that the electrode reaction does not occur identically in the entire electrode surface, and thus the performance of the battery is lowered.

Therefore, research into the polymer electrolyte for lithium secondary batteries to solve this problem of liquid electrolyte and to replace it has been actively conducted until recently.

Polymer electrolytes are largely divided into gel and solid types. Gel-type polymer electrolyte is an electrolyte that shows conductivity by impregnating a high-boiling liquid electrolyte in a polymer film and fixing it with lithium salt. Solid-type polymer electrolyte is a form in which dissociated lithium cations move in the polymer by adding lithium salt to a polymer containing hetero elements such as O, N, and S.

Gel-type polymer electrolyte contains a large amount of liquid electrolyte, and thus has ion conductivity similar to that of pure liquid electrolyte. However, there are disadvantages that the stability problem and the difficulty of the manufacturing process of the battery remain as they are.

On the other hand, in the case of solid polymer electrolytes, it does not contain liquid electrolyte, which improves the stability problem related to leakage and also has the advantage of high chemical and electrochemical stability. However, since the ion conductivity at room temperature is very low, a lot of research has been conducted to improve this.

Currently, the most commonly used material for the solid polymer electrolyte is polyethylene oxide (PEO), which has the ability to conduct ions despite being solid. However, in the case of the linear PEO-based polymer electrolyte, since the conductivity was very low as $1.0 \times 10^{-5}$ S/cm at room temperature due to high crystallinity, it was difficult to apply to the lithium secondary battery. In addition, the processability of the electrolyte is poor, the mechanical strength is insufficient, low voltage stability of less than 5 V appears and so on, and thus it is difficult to realize satisfactory performance by applying this to a battery.

In order to solve these problems, attempts have been made to develop a variety of materials such as mixed polymer electrolytes, interpenetrating network polymer electrolytes, and nonwoven solid polymer electrolytes and to apply to the battery. However, there are still problems with low ion conductivity and mechanical strength, and a narrow operating voltage range.

Therefore, the solid polymer electrolyte must necessarily have a high ion conductivity, adequate mechanical strength and a wide operating voltage range and also needs to contain a minimum amount of solvent to ensure operative stability of the battery.

PRIOR ART DOCUMENT

Patent Document (Patent Document 1) Korean Laid-Open Patent Publication No. 2003-0097009 (2003.12.31), "Polymer electrolyte with good leakage-resistance and lithium battery employing the same"

DISCLOSURE

Technical Problem

Therefore, as a result of conducting various studies to solve the above problems, the inventors of the present invention have confirmed that if a solid polymer electrolyte is prepared by photocuring a solid polymer electrolyte composition comprising a polymer (A) containing alkylene oxide and having one reactive double bond, a multifunctional cross-linkable polymer (B) and an ionic liquid containing an amide-based solvent and a lithium salt, the ionic conductivity of the electrolyte is improved, and the mechanical properties, flame retardancy, and electrochemical stability of the electrolyte are improved, thereby completing the present invention.

Accordingly, it is an object of the present invention to provide a solid polymer electrolyte having the above effects, and to provide an all-solid-state battery comprising the same and having improved performance.

Technical Solution

In order to achieve the above objects, the present invention provides a polymer electrolyte composition comprising a polymer (A) comprising alkylene oxide and having one reactive double bond, multifunctional cross-linkable polymer (B) and an ionic liquid, wherein the ionic liquid comprises an amide-based solvent and a lithium salt.

One embodiment of the present invention comprises a polymerization unit derived from one monomer selected from the group consisting of ethylene glycol methylether (meth)acrylate, ethylene glycol phenylether (meth)acrylate, diethylene glycol methyl ether (meth)acrylate, diethylene glycol 2-ethyl hexyl ether (meth)acrylate, polyethylene glycol methylether (meth)acrylate, polyethylene glycol ethylether (meth)acrylate, polyethylene glycol 4-nonylphenylether (meth)acrylate, polyethylene glycol phenyl ether (meth) acrylate, ethylene glycol dicyclopentenyl ether (meth)acrylate, polypropylene glycol methylether (meth)acrylate, polypropylene glycol 4-nonylphenylether (meth)acrylate or dipropyleneglycol allylether (meth)acrylate, and combinations thereof.

In one embodiment of the present invention, the multifunctional crosslinkable polymer (B) comprises a polymerization unit derived from one monomer selected from the group consisting of polyethylene glycol diacrylate, polyethylene glycol dimethacrylate, trimethylolpropane ethoxylate triacrylate, trimethylolpropane propoxylate triacrylate, polypropylene glycol dimethacrylate, polypropylene glycol diacrylate, divinylbenzene, polyester dimethacrylate, divinylether, ethoxylated bisphenol A dimethacrylate, tetraethyl ene glycol diacrylate, 1,4-butanediol diacrylate, 1,6-hexandiol diacrylate, ditrimethylolpropane tetraacrylate, pentaerythritol tetraacrylate, pentaerythritol ethoxylate tetraacrylate, dipentaerythritol pentaacrylate, dipentaerythritol hexaacrylate, trimethylolpropane trimethacrylate, and combinations thereof.

In one embodiment of the present invention, the multifunctional crosslinkable polymer (B) comprises one monomer-derived polymerization unit selected from the group consisting of polyethylene glycol diacrylate, polyethylene glycol dimethacrylate, trimethylolpropane ethoxylate triacrylate, trimethylolpropane propoxylate triacrylate, polypropylene glycol dimethacrylate, polypropylene glycol diacrylate, divinylbenzene, polyester dimethacrylate, divinylether, ethoxylated bisphenol A dimethacrylate, tetraethylene glycol diacrylate, 1,4-butanediol diacrylate, 1,6-hexandiol diacrylate, ditrimethylolpropane tetraacrylate, pentaerythritol tetraacrylate, pentaerythritol ethoxylate tetraacrylate, dipentaerythritol pentaacrylate, dipentaerythritol hexaacrylate, trimethylolpropane trimethacrylate, and combinations thereof.

In one embodiment of the present invention, the amide-based solvent comprises at least one selected from the group consisting of N-methylacetamide, N,N-dimethylformamide, 1-methyl-2-pyrrolidone, 2-pyrrolidinone, 1,3-dimethyl-2-imidazolidinone, ε-caprolactam, formamide, N-methylformamide, acetamide, N,N-dimethylacetamide, N-caprolactam, formamide, N-methylformamide, acetamide, N,N-dimethylacetamide, N-methylpropaneamide, and hexamethylphosphoric triamide.

In one embodiment of the present invention, the polymer (A) is present in an amount of 5 parts by weight to 40 parts by weight relative to 100 parts by weight of the total composition.

In one embodiment of the present invention, the polymer (B) is present in an amount of 5 parts by weight to 30 parts by weight relative to 100 parts by weight of the total composition.

In one embodiment of the present invention, the ionic liquid is present in an amount of 50 parts by weight to 90 parts by weight relative to 100 parts by weight of the total composition.

In one embodiment of the present invention, the lithium salt is present in an amount of 10 parts by weight to 50 parts by weight relative to 100 parts by weight of the total composition.

In one embodiment of the present invention, the weight ratio of the amide-based solvent and lithium salt is 40:60 to 60:40.

In one embodiment of the present invention, the lithium salt comprises at least one selected from the group consisting of $LiPF_6$, $LiBF_4$, $LiSbF_6$, $LiAsF_6$, $LiOH$, $LiOH \cdot H_2O$, $LiBOB$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, and LiFSI.

The present invention also provides a solid polymer electrolyte formed by photocuring the above-mentioned solid polymer electrolyte composition.

In one embodiment of the present invention, the thickness of the electrolyte is 50 μm to 300 μm.

In one embodiment of the present invention, the electrolyte has an ion conductivity of $1.0 \times 10^{-4}$ S/cm to $2.0 \times 10^{-3}$ S/cm on the basis of 25° C.

The present invention also provides an all solid-state battery comprising the solid polymer electrolyte.

Advantageous Effects

The solid polymer electrolyte formed by photocuring the solid polymer electrolyte composition according to the present invention has an advantage that since the ionic conductivity is improved and high mechanical stability, flame retardancy, and voltage stability are shown, it can be effectively applied to an all solid-state battery.

DESCRIPTION OF DRAWINGS

FIG. 1 shows a measurement image of the flame-retardant property of a solid polymer electrolyte according to Example 1 of the present invention.

FIG. 2 shows a measurement image of the flame-retardant property of a solid polymer electrolyte according to Comparative Example 1 of the present invention.

BEST MODE

Hereinafter, the present invention will be described in detail with reference to the accompanying drawings so that those skilled in the art may easily implement the present invention. However, the present invention may be embodied in many different forms and should not be construed as limited to the present specification.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The terminology used herein is for the purpose of describing particular embodiments only and is not intended to be limiting of the invention. The singular forms "a," "an," and "the" comprise plural referents unless the context clearly dictates otherwise. It is to be understood that the terms such as "comprise" or "have" as used in the present specification, are intended to designate the presence of stated features, numbers, steps, operations, components, parts or combinations thereof, but not to preclude the possibility of the presence or addition of one or more other features, numbers, steps, operations, components, parts, or combinations thereof.

Solid Polymer Electrolyte Composition

The present invention relates to a solid polymer electrolyte composition and a solid polymer electrolyte having high ionic conductivity, excellent mechanical properties and flame retardancy, more particularly to a solid polymer electrolyte composition and a solid polymer electrolyte formed by photocuring the same, comprising a polymer (A) containing alkylene oxide and having one reactive double bond, a multifunctional cross-linkable polymer (B) and an ionic liquid, wherein the ionic liquid comprises an amide-based solvent and a lithium salt.

In the case of the polymer electrolyte to which the conventional polyethylene oxide is applied, it had a limit of low ionic conductivity due to the high crystallinity of the polymer structure. However, the polymer electrolyte according to one embodiment of the present invention exhibits a flame retardant property and shows free-standing mechanical properties by applying a polymer formed by crosslinking a polymer (A) containing alkylene oxide and having one reactive double bond and a multifunctional cross-linkable polymer (B), and comprising an ionic liquid comprising an amide-based solvent and a lithium salt. In addition, the crystallinity of the electrolyte is lowered, thereby improving the fluidity of the polymer chain and also increasing the dielectric constant of the polymer, and thus dissociating more lithium ions and exhibiting higher ionic conductivity than the existing polyethylene oxide polymer.

Therefore, the solid polymer electrolyte according to the present invention can be manufactured by using a solid polymer electrolyte composition comprising a polymer (A) containing alkylene oxide and having one reactive double bond, a multifunctional cross-linkable polymer (B) and an ionic liquid, wherein the ionic liquid comprises an amide-based solvent and a lithium salt.

The polymer (A) comprises a polymerization unit derived from any one monomer derived polymerization unit monomer selected from the group consisting of ethylene glycol methylether (meth)acrylate [EGME(M)A], ethylene glycol phenyl ether (meth)acrylate [EGPE(M)A], diethylene glycol methylether (meth)acrylate [DEGME(M)A], diethylene glycol 2-ethylhexylether (meth)acrylate[DEGEHE(M)A], polyethylene glycol methylether (meth)acrylate [PEGME(M)A], polyethylene glycol ethyl ether (meth)acrylate [PEGEE(M)A], polyethylene glycol 4-nonylphenylether (meth)acrylate[PEGNPE(M)A], polyethylene glycol phenylether (meth)acrylate[PEGPE(M)A], ethylene glycol dicyclopenthenyl ether (meth)acrylate[EGDCPE(M)A], polypropylene glycol methylether (meth)acrylate [PP GME(M)A], polypropylene glycol 4-nonyl phenyl ether (meth)acrylate or dipropylene glycol allylether (meth)acrylate, and mixtures thereof. The polymerization unit derived from monomer derived polymerization unit monomer is a part constituting the polymer, and means a part derived from a specific monomer in the polymer molecular structure. For example, the acrylonitrile derived polymerization unit polymerization unit derived from acrylonitrile means a part derived from acrylonitrile in the polymer molecular structure.

The polymer (A) may include only one double bond capable of reacting in a molecule to prevent excessive crosslinking with a cross-linkable polymer to be described later. If there are two or more double bonds that can react in a molecule, the ratio of ethylene oxide to polymer (A) may be reduced, thereby reducing the ionic conductivity of the solid polymer electrolyte.

The polymer (A) may be comprised in an amount of 5 to 40 parts by weight relative to 100 parts by weight of the total composition. If the amount of the polymer (A) is less than 5 parts by weight, the proportion of ethylene oxide contained in the polymer (A) may be reduced, and thus the ionic conductivity of the electrolyte may be reduced. If the amount of the polymer (A) exceeds 40 parts by weight, the content of the polymer (B) is relatively reduced, resulting in insufficient crosslinking, thereby reducing the mechanical properties of the electrolyte, or the content of the lithium salt may be limited, thereby reducing the ionic conductivity of the electrolyte. The amount of the polymer (A) is appropriately adjusted within the above range.

The polymer (B) comprises a polymerization unit derived from any one monomer selected from the group consisting of polyethylene glycol diacrylate, polyethylene glycol dimethacrylate, trimethylolpropane ethoxylate triacrylate, trimethylolpropane propoxylate triacrylate, polypropylene glycol dimethacrylate, polypropylene glycol diacrylate, divinylbenzene, polyester dimethacrylate, divinylether, ethoxylated bisphenol A dimethacrylate, tetraethylene glycol diacrylate, 1,4-butanediol diacrylate, 1,6-hexandiol diacrylate, ditrimethylolpropane tetraacrylate, pentaerythritol tetraacrylate, pentaerythritol ethoxylate tetraacrylate, dipentaerythritol pentaacrylate, dipentaerythritol hexaacrylate, trimethylolpropane trimethacrylate, and combinations thereof. The polymer (B) contains two or more double bonds capable of reacting in the molecule, enabling crosslinking between the polymers included in the solid polymer electrolyte composition according to the present invention.

The polymer (B) may be included in an amount of 5 to 30 parts by weight relative to 100 parts by weight of the total composition. If the amount of the polymer (B) is less than 5 parts by weight, it may be difficult to achieve sufficient crosslinking of the electrolyte composition and the mechanical properties of the electrolyte may be reduced. If the amount of the polymer (B) exceeds 30 parts by weight, the content of the polymer (A) may be relatively reduced, or the content of lithium salt may be limited, thereby decreasing the ionic conductivity of the electrolyte.

The solid polymer electrolyte composition according to the present invention comprises an ionic liquid, and the ionic liquid may comprise an amide-based solvent and a lithium salt.

The ionic liquid is ionic salts (or molten salts) consisting of cation and anion. An ionic compound consisting of cation and nonmetallic anion, such as sodium chloride, is usually called ionic liquid, which is present as a liquid at temperatures below 100° C., unlike those melting at high temperatures above 800° C. In particular, the ionic liquid that exists as a liquid at room temperature is called room temperature ionic liquid (RTIL).

The ionic liquid is non-volatile, non-toxic, and non-flammable, and has excellent thermal stability, and ionic conductivity, as compared to common liquid electrolytes. In addition, because of high polarity, since the ionic liquid has the unique properties of dissolving inorganic and organometallic compounds well, and existing as a liquid over a wide temperature range, the ionic liquids are used in a wide range of chemical fields, including catalysts, separations, and electrochemistry by taking the advantages of acquiring various properties by changing the structure of cation and anion constituting the ionic liquid.

The ionic liquid may be included in an amount of 50 to 90 parts by weight based on 100 parts by weight of the total composition, and may further comprise a lithium salt to form a so-called 'dissolved ionic liquid (solvated ionic liquid)'. If the ionic liquid is less than 50 parts by weight, the lithium salt may not be sufficiently dissolved in the ionic liquid, or the ionic conductivity of the entire electrolyte may be reduced. If the ionic liquid exceeds 90 parts by weight, the relative content of the polymer (A) or polymer (B) is reduced, the mechanical properties of the electrolyte may be worsened or the solid content of the all solid-state battery may be reduced, and excess amount of ionic liquid may remain, making it difficult to implement a complete solid electrolyte. Therefore, the amount of the ionic liquid is appropriately adjusted in the above range.

The lithium salt may act as a source of lithium ions in the battery to enable the basic operation of the lithium secondary battery, and serve to promote the movement of lithium ions between the positive electrode and the negative electrode. The lithium salt may be any one selected from the group consisting of $LiPF_6$, $LiBF_4$, $LiSbF_6$, $LiAsF_6$, $LiOH$, $LiOH \cdot H_2O$, $LiBOB$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, LiFSI, $LiClO_4$, and combinations thereof, but is not limited thereto.

The content of the lithium salt may be 10 to 50 parts by weight, preferably 20 to 50 parts by weight, more preferably 30 to 50 parts by weight, relative to 100 parts by weight of total electrolyte composition. If the content of the lithium salt is less than 10 parts by weight, the ion conductivity of the electrolyte may be lowered due to the low content. If the content of lithium salt is 50 parts by weight or more, some lithium salts do not dissociate in the polymer electrolyte and exist in a crystalline state and thus do not contribute to the ion conductivity, but rather may act to interfere with ion conductivity, thereby reducing ion conductivity and relatively decreasing polymer content, and thus weakening the mechanical strength of the solid polymer electrolyte. Therefore, the content of the lithium salt is appropriately adjusted in the above range.

The amide-based solvent may comprise at least one selected from the group consisting of N-methylacetamide, N, N-dimethylformamide, 1-methyl-2-pyrrolidone, 2-pyrrolidinone, 1,3-dimethyl-2-imidazolidinone, 2-pyrrolidinone, ε-caprolactam, formamide, N-methylformamide, acetamide, N, N-dimethylacetamide, N-methylpropaneamide, and hexamethylphosphoric triamide, and preferably may be N-methylacetamide (NMAC). The amide-based solvent has an excellent thermal stability compared to the succinonitrile used in the preparation of the conventional electrolyte, and has an advantage of enabling the preparation of electrolyte with improved stability with the negative electrode of the battery.

In one embodiment of the present invention, the amide-based solvent and lithium salt comprised in the ionic liquid may be included in a weight ratio of 40:60 to 60:40, and preferably in a weight ratio of 45:55 to 55:45. If the amide-based solvent is included below the above range, the flame retardant property of the electrolyte which is achieved by the inclusion of an amide-based solvent may be reduced. If the amide-based solvent exceeds the above range, the ionic conductivity of the electrolyte may be reduced due to the relatively low content of lithium salt.

The polymer electrolyte according to one embodiment may exhibit excellent ionic conductivity. Specifically, the ion conductivity of the polymer electrolyte may be $1.0 \times 10^{-4}$ to $2.0 \times 10^{-3}$ S/cm based on 25° C. When having an ionic conductivity falling within the above range, it is possible to stably operate the all solid-state battery containing the electrolyte according to the present invention.

The thickness of the electrolyte according to one embodiment of the present invention is preferably 50 to 300 μm. As the thickness of the electrolyte is thinner, the energy density can be improved and the ionic conductivity can be increased. However, If the thickness is less than 50 μm, there is a problem that the proper mechanical strength of the electrolyte cannot be secured. Therefore, the thickness is appropriately adjusted within the above range.

Preparation Method of Solid Polymer Electrolyte

In one embodiment of the present invention, there is provided a method for preparing the solid polymer electrolyte. The preparation method of the electrolyte is not particularly limited, and methods known in the art may be used.

The preparation method comprises the steps of (1) mixing the lithium salt with the amide-based solvent; (2) mixing the polymer (A) containing alkylene oxide and having one reactive double bond and multifunctional cross-linkable polymer (B); (3) mixing the materials prepared in step (1) and step (2); and (4) photocuring the mixture of step (3) to obtain a solid polymer electrolyte. In the preparation method, the polymer (A) and the multifunctional cross-linkable polymer (B) form a random copolymer through a free radical polymerization reaction and cause crosslinking reactions through light or thermal curing. Preferably, before step (4), the mixture may be purged with nitrogen.

When the curing process is performed by photocuring, the photo-initiator may be further included. At least one photo-initiators selected from the group consisting of DMPA(2,2-dimethoxy-2-phenylacetophenone), HOMPP(2 hydroxy-2-methylpropiophenone), LAP(Lithium phenyl-2,4,6-trimethylbenzoylphosphinate), IRGACURE 2959(1-[4-(2-Hydroxyethoxy)-phenyl]-2-hydroxy-2-methyl-1-propane-1-one) may be further added, and preferably, HOMPP (2 hydroxy-2-methylpropiophenone) may be used, but is not necessarily limited thereto. The photo-initiator described above is one that can form radicals by ultraviolet irradiation. If the concentration of the photo-initiator is too low, the photopolymerization reaction does not proceed efficiently, resulting in incomplete formation of the polymer electrolyte. If the concentration of the photo-initiator is too high, the photopolymerization reaction proceeds so rapidly that the uniformity of the polymer electrolyte may be lowered and the applicability may be limited. Therefore, the photo-initiator can be used in an appropriate amount depending on the physical properties of the desired electrolyte.

The photocuring may be performed by irradiating ultraviolet (UV) to the electrolyte composition. In this case, there is an advantage that the curing can be made in a very fast time. The ultraviolet rays irradiated to the electrolyte composition may be ultraviolet rays having a wavelength of 254 to 360 nm. The ultraviolet rays are light rays whose wavelengths are shorter than those of the violet visible rays and are abbreviated as UV (Ultraviolet rays). The ultraviolet rays are classified into ultraviolet rays A having a long wavelength (320 nm to 400 nm), ultraviolet rays B having a medium wavelength (280 nm to 300 nm), and ultraviolet rays C having a short wavelength (100 nm to 280 nm). When irradiating the ultraviolet rays to the electrolyte composition, the irradiation time period of the ultraviolet rays may be 5 to 30 minutes. However, depending on the intensity of the ultraviolet rays (UV) to be irradiated, the irradiation time of the ultraviolet rays (UV) may vary, and thus the irradiation time period of the ultraviolet rays (UV) is not limited to the above range.

The preparation method of the electrolyte according to the present invention has the advantage that the in-situ polymerization can be carried out by a single container reaction and the process is easy.

All Solid-State Battery

In another one embodiment of the present invention, the present invention provides an all solid-state battery comprising the solid polymer electrolyte and an electrode.

The all solid-state battery proposed in the present invention defines the constitution of the solid polymer electrolyte as described above, and the other elements constituting the battery, that is, the positive electrode and the negative electrode, are not particularly limited in the present invention and follow the description below.

The negative electrode for the all solid-state battery is a lithium metal alone, or a negative electrode current collector on which the negative electrode active material is laminated.

In this case, the negative electrode active material may be any one selected from the group consisting of lithium metal, a lithium alloy, a lithium metal composite oxide, a lithium-containing titanium composite oxide (LTO), and a combination thereof. In this case, the lithium alloy may be an alloy of lithium and at least one metal selected from Na, K, Rb, Cs, Fr, Be, Mg, Ca, Sr, Ba, Ra, Al and Sn. Also, the lithium metal composite oxide is an oxide ($MeO_x$) of lithium and any one metal (Me) selected from the group consisting of Si, Sn, Zn, Mg, Cd, Ce, Ni and Fe and for example, may be $Li_xFe_2O_3(0<x\leq1)$ or $Li_xWO_2(0<x\leq1)$.

In addition, the negative electrode active material may be metal composite oxides such as $Sn_xMe_{1-x}Me'_yO_z$ (Me:Mn, Fe, Pb, Ge; Me':Al, B, P, Si, elements of groups 1, 2 and 3 of the periodic table, halogen; $0<x\leq1$; $1<y\leq3$; $1z\leq8$); oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$, and carbon-based negative electrode active materials such as crystalline carbon, amorphous carbon, or carbon composite may be used alone or in combination of two or more.

In addition, the negative electrode current collector is not particularly limited as long as it has electrical conductivity without causing chemical changes in the all solid-state battery. For example, copper, stainless steel, aluminum, nickel, titanium, sintered carbon; copper or stainless steel whose surface is treated with carbon, nickel, titanium, silver or the like; aluminum-cadmium alloy or the like may be used as the negative electrode current collector. In addition, the shape of the negative electrode current collector can be various forms such as a film, sheet, foil, net, porous body, foam, nonwoven fabric and the like having fine irregularities on a surface, as with the positive electrode current collector.

The positive electrode for the all solid-state battery according to the present invention is not particularly limited and may be a material used for a known all solid-state battery.

If the electrode is a positive electrode, it is a positive electrode current collector; if the electrode is a negative electrode, it is a negative electrode current collector.

The positive electrode current collector is not particularly limited as long as it has high electrical conductivity without causing chemical changes in the relevant battery. For example, stainless steel, aluminum, nickel, titanium, sintered carbon, or aluminum or stainless steel whose surface is treated with carbon, nickel, titanium, silver or the like may be used.

The positive electrode active material can be varied depending on the use of the lithium secondary battery, and lithium transition metal oxides such as $LiNi_{0.8-x}Co_{0.2}AlxO_2$, $LiCo_xMn_yO_2$, $LiNi_xCo_yO_2$, $LiNi_xMn_yO_2$, $LiNi_xCo_yMn_zO_2$, $LiCoO_2$, $LiNiO_2$, $LiMnO_2$, $LiFePO_4$, $LiCoPO_4$, $LiMnPO_4$ and $Li_4Ti_5O_{12}$; chalcogenides such as $Cu_2Mo_6S_8$, FeS, CoS and MiS; and oxides, sulfides, or halides of such as scandium, ruthenium, titanium, vanadium, molybdenum, chromium, manganese, iron, cobalt, nickel, copper, zinc may be used, and more specifically, $TiS_2$, $ZrS_2$, $RuO_2$, $Co_3O_4$, $Mo_6S_8$, $V_2O_5$ etc. may be used, but the present invention is not limited thereto.

The shape of the positive electrode active material is not particularly limited, and may be a particle shape, for example, a spherical shape, an elliptical shape, a rectangular shape, or the like. The average particle diameter of the positive electrode active material may be, but is not limited thereto, within the range of 1 to 50 μm. The average particle diameter of the positive electrode active material can be obtained, for example, by measuring the particle diameters of the active materials observed by a scanning electron microscope and calculating the average value thereof.

The binder contained in the positive electrode is not particularly limited, and fluorine-containing binders such as polyvinylidene fluoride (PVDF) and polytetrafluoroethylene (PTFE) can be used.

The content of the binder is not particularly limited as long as the positive electrode active material can be fixed thereby, and may be in the range of 0 to 10% by weight based on the entire positive electrode.

The positive electrode may additionally contain electrically conductive materials. The electrically conductive materials are not particularly limited as long as they can improve the electrical conductivity of the positive electrode, and examples thereof may include nickel powder, cobalt oxide, titanium oxide, and carbon. Examples of the carbon may include any one or one or more selected from the group consisting of Ketjen black, acetylene black, furnace black, graphite, carbon fiber, and fullerene.

In this case, the content of the electrically conductive materials may be selected in consideration of other conditions of the battery such as the type of the electrically conductive materials, and for example, may be in the range of 1 to 10% by weight with respect to the entire positive electrode.

Preparation of an all solid-state battery having the constitution as described above is not particularly limited in the present invention, but is possible through a known method.

As an example, the solid electrolyte is placed between the positive electrode and the negative electrode, followed by compression molding to assemble the cell. In addition, the preparation may be performed so that the first polymer electrolyte placed to be in contact with the positive electrode.

The assembled cell is placed in an exterior material and sealed by heat compression or the like. Laminate packs made of aluminum, stainless steel, or the like, and cylindrical or square metal containers are very suitable as the exterior material.

Hereinafter, the present invention will be described in more detail with reference to examples and the like, but the scope and contents of the present invention are not to be construed as being reduced or limited by the following examples. In addition, it will be apparent to those skilled in the art, on the basis of the disclosure of the present invention, including the following examples, that the present invention which is not specifically presented with experimental results can be easily carried out, and that such variations and modifications fall within the scope of the appended claims.

Example: Preparation of Solid Polymer Electrolyte

First, N-methylacetamide (Sigma Aldrich company, hereinafter NMAC) as an amide-based solvent in the reaction vessel and LiTFSI (Sigma Aldrich company) which is a lithium salt vacuum-dried at 100° C. for 24 hours were mixed in the ratio of Table 1 below, and stirred at room temperature for 4 hours in a glove box to prepare an ionic liquid.

After that, polyethylene glycol methylether (meth)acrylate (Sigma Aldrich company, Mn: 480, hereinafter PEGMEA) as a polymer (A) containing alkylene oxide and having one reactive double bond, and polyoxyethylene glycol diacrylate (Sigma Aldrich company, Mn: 700, hereinafter PEGDA) as a multifunctional cross-linkable polymer (B) were added to the ionic liquid in a total amount of 2 g as shown in Table 1 below, and stirred at room temperature for 4 hours.

Next, 1 part by weight of Irgacure 819 (BASF company) as a photo-initiator relative to 100 parts by weight of the total electrolyte composition is added, and completely dissolved by stirring using a vortex, and the residual oxygen was removed while purging in nitrogen gas conditions to prepare an electrolyte composition.

The electrolyte composition was coated on a Teflon release film by a doctor blade and photopolymerized by applying ultraviolet light for 1 hour using black light. After the ultraviolet irradiation was completed, a solid polymer electrolyte in the form of a film was obtained on the Teflon release film.

TABLE 1

| Example | PEGMEA (part by weight) | PEGDA (part by weight) | NMAC (part by weight) | LiTFSI (part by weight) | Irgacure 819 (part by weight) | Curing method |
|---|---|---|---|---|---|---|
| 1 | 15 | 5 | 40 | 40 | 1 | Photocuring |
| 2 | 30 | 10 | 30 | 30 | 1 | Photocuring |
| 3 | 20 | 20 | 30 | 30 | 1 | Photocuring |

Comparative Example: Synthesis of Solid Polymer Electrolyte

An electrolyte was prepared in the same manner as in the example, except that succinonitrile was used instead of amide-based solvent as shown in Table 2 below.

TABLE 2

| Comparative Example | PEGMEA (part by weight) | PEGDA (part by weight) | Succinonitrile (part by weight) | LiTFSI (part by weight) | Irgacure 819 (part by weight) | Curing method |
|---|---|---|---|---|---|---|
| 1 | 15 | 5 | 40 | 40 | 1 | Photocuring |
| 2 | 30 | 10 | 30 | 30 | 1 | Photocuring |

Experimental Example 1: Evaluation of Ionic Conductivity of Solid Polymer Electrolyte The ionic conductivity of the electrolytes prepared in Examples 1 to 3 and Comparative Examples 1 to 2 were calculated using Equation 1 after measuring their impedance.

Film samples of the solid polymer electrolyte having a constant width and thickness were prepared for the measurement. A 2032-type coin cell was prepared by contacting a sus substrate having excellent electron conductivity as an ion blocking electrode to both sides of the plate-shaped sample, and then an alternating voltage of 10 mV was applied through the electrodes on both sides of the sample. At this time, the measurement frequency as an applied condition was set in an amplitude range of 1 Hz to 5 MHz, and impedance was measured using VMP3 from BioLogic company. The resistance of the bulk electrolyte was obtained from the intersection ($R_b$) where the semicircle or straight line of the measured impedance trajectory meets the real axis, and the ionic conductivity of the polymer solid electrolyte was calculated from the width and thickness of the sample and the results are shown in Table 3 below. The thickness of each sample was measured by calculating the thickness of the sus substrate from the thickness of the sus substrate and the electrolyte of the coin cell after impedance measurement.

$$\sigma(S \cdot cm^{-1}) = \frac{1}{R_b} \frac{t}{A} \quad [\text{Equation 1}]$$

σ: Ionic conductivity
$R_b$: Intersection ($R_b$) where impedance trajectory meets real axis
A: Width of sample
t: Thickness of sample

TABLE 3

| Item | Ionic conductivity (S/cm) 25° C. |
|---|---|
| Example 1 | $1.0 \times 10^{-3}$ |
| Example 2 | $4.0 \times 10^{-4}$ |
| Example 3 | $4.0 \times 10^{-4}$ |
| Comparative Example 1 | $1.3 \times 10^{-3}$ |
| Comparative Example 2 | $4.5 \times 10^{-4}$ |

According to Table 3, it was found that the solid polymer electrolyte according to the present invention, to which the ionic liquid comprising the amide-based solvent is applied shows excellent ionic conductivity similar to electrolyte of the comparative example using succinonitrile.

Experimental Example 2: Measurement of Flame Retardant Property of Solid Polymer Electrolyte In order to confirm the flame-retardant property of the solid polymer electrolyte according to the present invention, a sample of each component and a circular sample having a diameter of 2 cm of electrolytes prepared according to the comparative examples and the examples were prepared. Each sample was burned using a torch and the results were examined for a flame-retardant property. FIGS. 1 and 2 show results of the flame-retardant properties of the solid polymer electrolytes according to the example and the comparative example.

Referring to FIGS. 1 and 2, it was found that the solid polymer electrolyte of Example 1 according to the present invention, to which the ionic liquid comprising the amide-based solvent was applied, exhibits excellent flame-retardant properties by self-extinguishing, which does not burn by flame and extinguishes within 2 seconds. However, it was confirmed that the electrolyte of Comparative Example 1, which does not contain an amide-based solvent, ignites after about 5 seconds of torch burning and burns until the whole is burned, and thus was found that the flame-retardant property is not good.

The invention claimed is:

1. A solid polymer electrolyte composition comprising:
    a polymer (A) comprising alkylene oxide and having one reactive double bond;
    a multifunctional cross-linkable polymer (B); and
    an ionic liquid, wherein the ionic liquid comprises N-methylacetamide and a lithium salt,
    wherein N-methylacetamide and the lithium salt are present in a weight ratio of 40:60 to 60:40.

2. The solid polymer electrolyte composition according to claim 1, wherein the polymer (A) comprises a polymerization unit derived from any one monomer selected from the group consisting of ethylene glycol methylether (meth)acrylate, ethylene glycol phenylether (meth)acrylate, diethylene glycol methylether (meth)acrylate, diethylene glycol 2-ethylhexylether (meth)acrylate, polyethylene glycol methylether (meth)acrylate, polyethylene glycol ethylether (meth)acrylate, polyethylene glycol 4-nonylphenylether (meth)acrylate, polyethylene glycol phenylether (meth)acrylate, ethylene glycol dicyclopenthenyl ether (meth)acrylate, polypropylene glycol methylether (meth)acrylate, polypropylene glycol 4-nonylphenylether (meth)acrylate or dipropylene glycol allylether (meth)acrylate, and combinations thereof.

3. The solid polymer electrolyte composition according to claim 1, wherein the multifunctional crosslinkable polymer (B) comprises a polymerization unit derived from any one monomer selected from the group consisting of polyethylene glycol diacrylate, polyethylene glycol dimethacrylate, trimethylolpropane ethoxylate triacrylate, trimethylolpropane propoxylate triacrylate, polypropylene glycol dimethacrylate, polypropylene glycol diacrylate, divinylbenzene, polyester dimethacrylate, divinylether, ethoxylated bisphenol A dimethacrylate, tetraethylene glycol diacrylate, 1,4-butanediol diacrylate, 1,6-hexandiol diacrylate, ditrimethylolpropane tetraacrylate, pentaerythritol tetraacrylate, pentaerythritol ethoxylate tetraacrylate, dipentaerythritol pentaacrylate, dipentaerythritol hexaacrylate, trimethylolpropane trimethacrylate, and combinations thereof.

4. The solid polymer electrolyte composition according to claim 1, wherein the polymer (A) is present in an amount of 5 parts by weight to 40 parts by weight relative to 100 parts by weight of the total composition.

5. The solid polymer electrolyte composition according to claim 1, wherein the polymer (B) is present in an amount of 5 parts by weight to 30 parts by weight relative to 100 parts by weight of the total composition.

6. The solid polymer electrolyte composition according to claim 1, wherein the ionic liquid is present in an amount of 50 parts by weight to 90 parts by weight relative to 100 parts by weight of the total composition.

7. The solid polymer electrolyte composition according to claim 1, wherein the lithium salt is present in an amount of 10 parts by weight to 50 parts by weight relative to 100 parts by weight of the total composition.

8. The solid polymer electrolyte composition according to claim 1, wherein the lithium salt comprises at least one selected from the group consisting of $LiPF_6$, $LiBF_4$, $LiSbF_6$, $LiAsF_6$, $LiOH$, $LiOH \cdot H_2O$, $LiBOB$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, and LiFSI.

9. A solid polymer electrolyte formed by photocuring the solid polymer electrolyte composition according to claim 1.

10. The solid polymer electrolyte according to claim 9, wherein a thickness of the electrolyte is 50 μm to 300 μm.

11. The solid polymer electrolyte according to claim 9, wherein an ionic conductivity of the electrolyte is $1.0 \times 10^{-4}$ S/cm to $2.0 \times 10^{-3}$ S/cm based on 25° C.

12. An all solid-state battery comprising the solid polymer electrolyte according to claim 9.

* * * * *